United States Patent [19]

Awa et al.

[11] Patent Number: 4,722,228
[45] Date of Patent: Feb. 2, 1988

[54] REMOTE SEAL-TYPE PRESSURE SIGNAL GENERATOR

[75] Inventors: Shunichiro Awa; Jun Kawachi, both of Yokohama, Japan

[73] Assignee: Honeywell Inc., Minneapolis, Minn.

[21] Appl. No.: 930,822

[22] Filed: Nov. 14, 1986

[30] Foreign Application Priority Data

Nov. 20, 1985 [JP] Japan ............................ 60-180400[U]
Nov. 22, 1985 [JP] Japan ............................ 60-180401[U]

[51] Int. Cl.$^4$ .......................... G01L 7/08; G01L 9/00; G01L 19/04
[52] U.S. Cl. ........................................ 73/706; 73/301; 73/708; 73/717
[58] Field of Search ................. 73/706, 708, 715, 716, 73/717, 718, 719, 720, 721, 722, 861.47, 301, 299

[56] References Cited

U.S. PATENT DOCUMENTS

| | | | |
|---|---|---|---|
| 3,939,708 | 2/1976 | Greer et al. | 73/861.47 |
| 3,990,310 | 11/1976 | Greer et al. | 73/725 |
| 4,163,395 | 8/1979 | Medlar et al. | 73/708 |

Primary Examiner—Donald O. Woodiel

Attorney, Agent, or Firm—Mitchell J. Halista; Albin Medved

[57] ABSTRACT

A remote seal-type pressure signal generator has a pressure measuring end having a sealing diaphragm facing a pressure to be measured, a pressure detector body connected to the pressure measuring end through a first capillary tube, the detector body having a pressure-receiving space in which a pressure transmitting medium is liquid-sealed and pressure detecting means for detecting an internal pressure of the pressure-receiving space by way of a pressure difference thereof with respect to a pressure of a second pressure-receiving space to which a second pressure is applied, and a flexible protective pipe covering the capillary tube between said detector body and said pressure measuring end, a second capillary tube is housed in the protective tube, and extending from the second pressure-receiving space in the detector body while having substantially the same length as the first capillary tube, and having a distal end closed in the vicinity of the pressure measuring end, with the pressure transmitting medium being liquid-sealed in the second pressure-receiving space and the second capillary tube.

6 Claims, 5 Drawing Figures

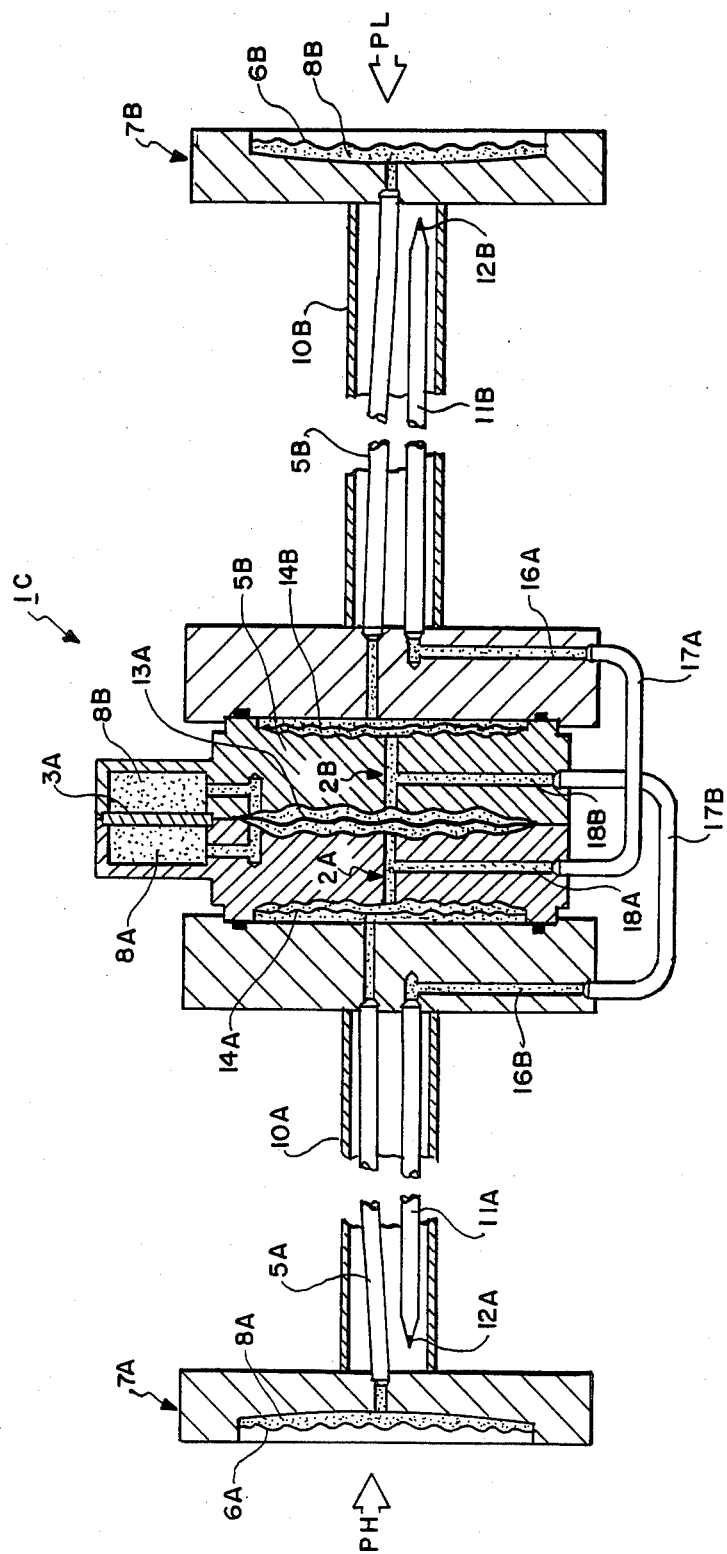
F I G. 5

REMOTE SEAL-TYPE PRESSURE SIGNAL GENERATOR

BACKGROUND OF THE PRIOR ART

1. Field of the Invention

The present invention relates to a remote seal-type pressure signal generator. More specifically, the present invention relates to a remote seal-type pressure signal generator wherein a pressure measuring end of the signal generator is coupled to a detector body through a capillary tube.

2. Description of the Prior Art

A remote seal-type pressure signal generator is well-known for measuring a pressure or the like of various types of process fluids, e.g., the devices shown in U.S. Pat. Nos. 2,906,095, 3,853,007 and 3,999,435. Such a remote seal-type pressure signal generator is effective when it is used to measure the pressure of a process fluid having high corrosiveness, high viscosity, condensability, high temperature or a metal precipitate. A process fluid-contacting sealing diaphragm is provided at a pressure measuring end to separate a detector body from a pressure to be measured. The sealing diaphragm and the detector body are connected through a capillary tube filled with a sealing liquid, such as silicone oil, which is sealed in the capillary tube as a pressure transmitting medium, thereby providing a liquid sealing structure. A remote seal-type pressure signal generator of this type can be used to detect the internal pressure of a sealed tank, such as a high-temperature reaction tower of a petroleum refining plant.

SUMMARY OF THE INVENTION

An object of the present invention is to provide an improved remote seal-type pressure signal generator.

In accomplishing this and other objects, there has been provided, in accordance with the present invention, a remote seal-type pressure signal generator including a pressure measuring end having a sealing diaphragm facing a pressure to be measured, a pressure detector body connected to the pressure measuring end through a first capillary tube, the detector body having a pressure-receiving space in which a pressure transmitting medium is liquid-sealed and pressure detecting means for detecting an internal pressure of the pressure-receiving space by way of a pressure difference thereof with respect to a pressure of a second pressure-receiving space to which a second pressure is applied, a flexible protective pipe covering the capillary tube between the detector body and the pressure measuring end, and a second capillary tube is housed in the protective tube, and extending from the second pressure-receiving space in the detector body while having substantially the same length as the first capillary tube, and having a distal end closed in the vicinity of the pressure measuring end, with the pressure transmitting medium being liquid-sealed in the second pressure-receiving space and the second capillary tube.

BRIEF DESCRIPTION OF THE DRAWINGS

A better understanding of the present invention may be had when the following detailed description is read in connection with the accompanying drawings, in which:

FIG. 5 is a cross-sectional illustration of a third embodiment of the present invention for use in the system shown in FIG. 3.

Referring to FIG. 1 in more detail, there is shown a remote seal-type pressure signal generator 1 with a detector body 5 and a pressure deriving section 7. The detector body 5 has a pair of pressure-receiving spaces 2 and 3, a pressure detection sensor 4 for detecting a pressure difference between the pressure-receiving spaces 2 and 3. The pressure deriving section 7 has a sealing diaphragm 7a as a pressure measuring end connected to the pressure-receiving space 2 of the detector body 5 through a capillary tube 6. A space continuously extends from an inner chamber defined by the sealing diaphragm 7a of the pressure deriving section 7 to the corresponding pressure-receiving space 2 of the detector body 5 through the capillary tube 6. A sealing liquid 8, such as silicone oil, is sealed in this space as a pressure transmitting medium. The air is introduced in the pressure-receiving space 3. The pressure deriving section 7 of the pressure signal generator 1 is coupled to a pressure deriving hole 9a formed in part of a tank 9 as a pressure measured portion. The seal diaphragmk 7a as a pressure-receiving element of the pressure deriving section 7 opposes the interior of the tank 9, and measures the internal pressure of the tank 9 by way of its pressure difference with respect to the atmospheric pressure, thereby measuring the liquid level in the tank 9.

Figure 3:
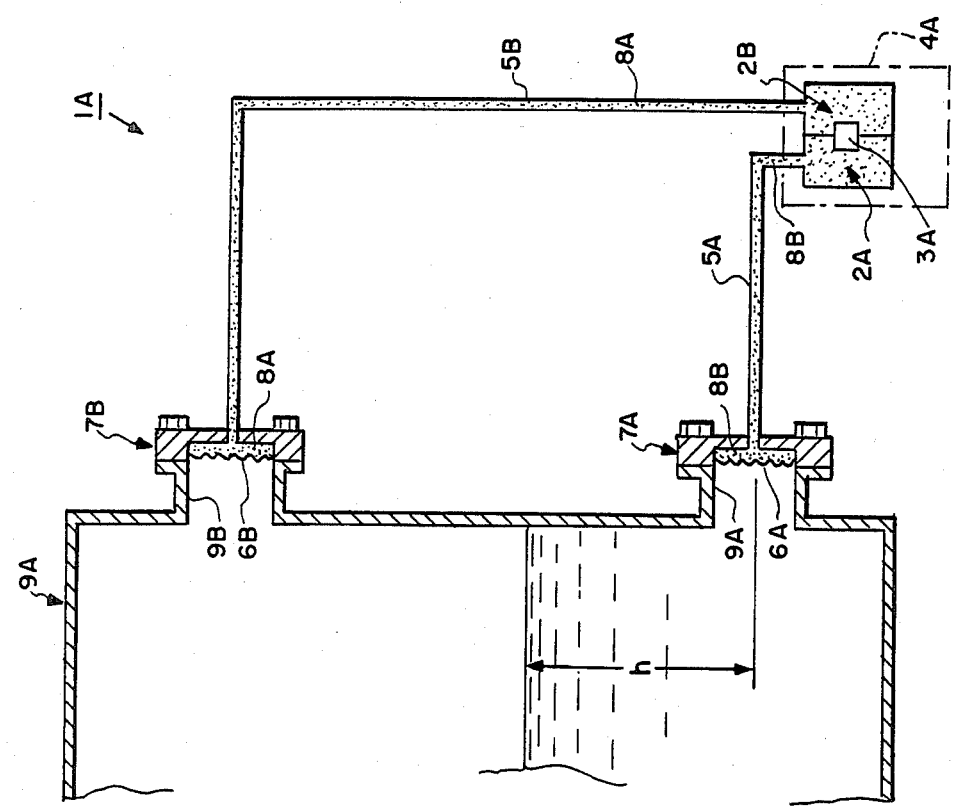
FIG. 3 is a schematic illustration of a working environment of an alternate embodiment of a remote seal-type pressure signal generator.

In the remote seal-type pressure signal generator 1 having the above configuration, the capillary tube 6 coupling the pressure measuring section 7 and the signal generator detector body 5 is made of a suitable material. e.g., stainless steel or the like, and is thermally expanded or shrunk by the thermal influence of the ambient temperature. A fill fluid, e.g., silicone oil or the like, is sealed in the capillary tube 6 as the sealing liquid 8 is also thermally expanded or shrunk. When such thermal changes occur, the volume of the capillary tube 6 is correspondingly changed. Even if the expansion amount of the sealing liquid 8 is considered, its pressure transmitting coefficient is changed, and an appropriate pressure measurement value output cannot be obtained.

In order to prevent this, various temperature compensating countermeasures have been conventionally taken. For example, a temperature compensating circuit has been provided in the pressure signal generator 1. With the conventional configuration, however, since temperature compensation is performed for the entire device including the pressure measuring section 7, the capillary tube 6, and the detector body 5, a local temperature influence on the above-described pressure transmitting system cannot be corrected. More particularly, in the remote seal-type pressure signal generator 1, the capillary tube 6 is often as long as about five to ten meters or more. In this case, the capillary tube 6 can be locally heated, e.g., by sunlight, whereas the atmospheric pressure-side pressure-receiving space is usually less subjected to the above temperature influence. It is usually impractical to correct such a local thermal influence. Therefore, a correcting means hasving a simple configuration has been sought.

In order to respond to the above demands, a remote seal-type signal generator according to the present invention uses a pressure measuring end having a sealing diaphragm facing a pressure measured portion and a detector body connected to the pressure measuring end through a capillary tube. The detector body has a pressure-receiving space in which a pressure transmitting fill medium is liquid-sealed and pressure detecting means for detecting the internal pressure of the pressure-receiving space by way of a pressure difference thereof with respect to a pressure of a second pressure-receiving space to which a second or reference pressure, e.g., atmospheric pressure, is applied. A flexible protective pipe covers the capillary tube. A second capillary tube is housed in the protective tube. The second capillary tube extends from the second pressure-receiving space, has substantially the same length as the capillary tube, and has a distal end closed in the vicinity of the pressure measuring end. A pressure transmitting fill medium is liquid-sealed in the second pressure-receiving space and the second capillary tube.

According to the present invention, a reference pressure-side second capillary tube is provided in a protective tube together with a pressure measuring-side first capillary tube to be parallel thereto. Therefore, even if a pressure measuring-side capillary tube connecting a pressure measuring end and a detector body is locally heated an an internal sealing liquid or the tube itself is influenced by thermal expansion or the like, a change in volume thereof is temperature-compensated by the second capillary tube arranged in the protective tube together with the first capillary tube as the pressure measuring side, thus prohibiting an output error caused by local temperature change.

Figure 1:
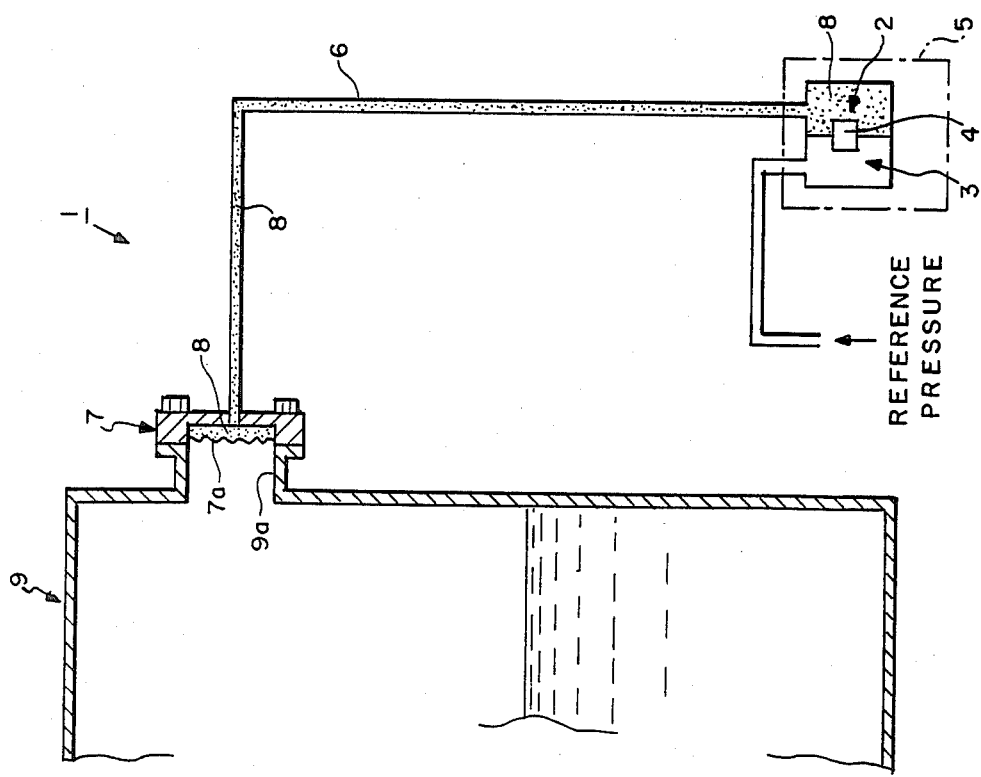
FIG. 1 is a schematic illustration of a working environment of a remote seal-type pressure signal generator.
Figure 2:
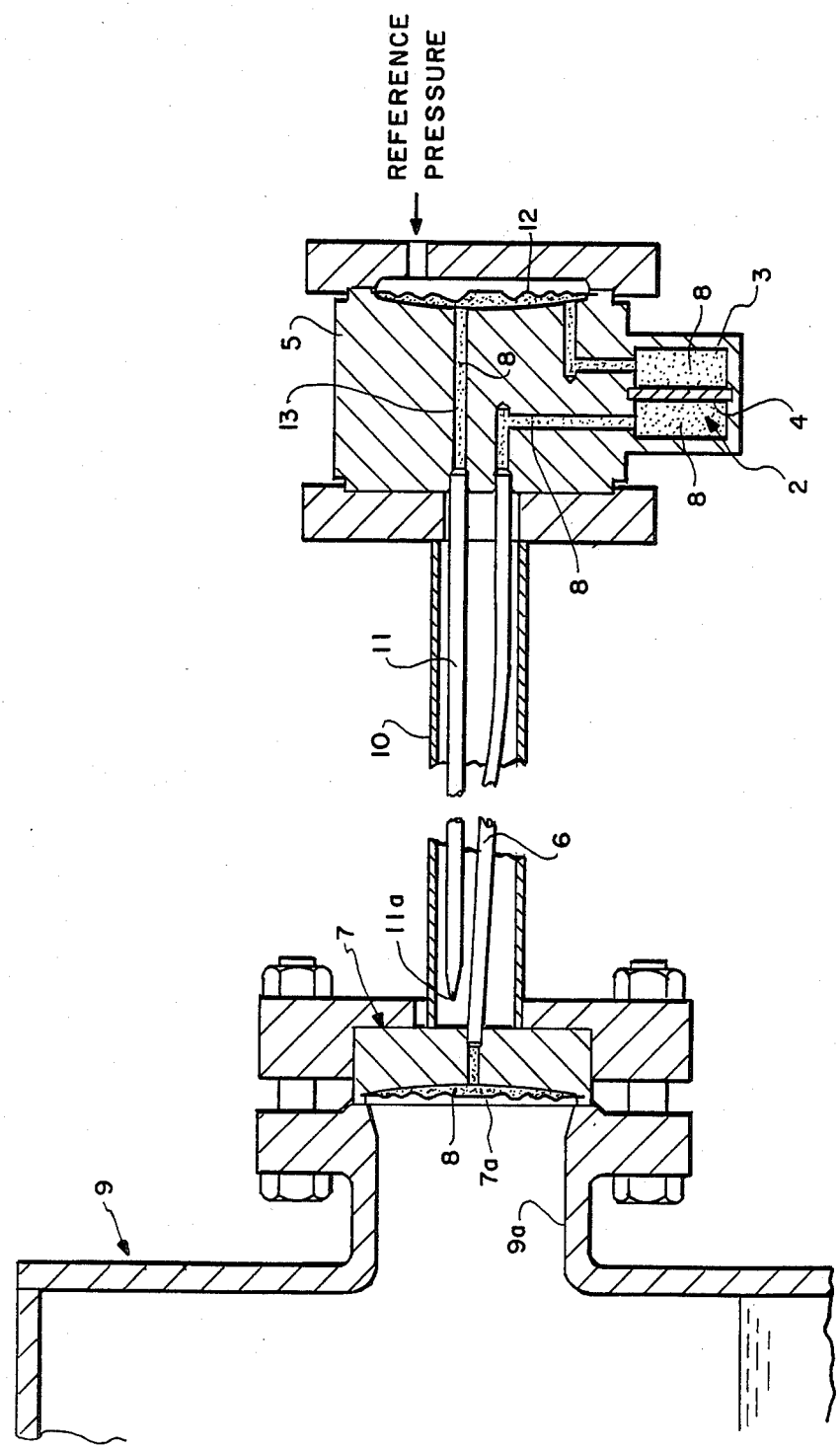
FIG. 2 is a cross-sectional view of a remote seal-type pressure signal generator embodying a first example of the present invention for use in the system shown in FIG. 1.

FIG. 1 shows a cross-section remote seal-type pressure signal generator according to an embodiment of the present invention. The same reference numerals in FIG. 1 denote the same or equivalent portions as in FIG. 2, and a second detailed description thereof is omitted. The remote seal-type pressure signal generator 1 according to the present invention has the following characteristic features. Namely, the pressure signal generator 1 has a pressure measuring end 7 and a detector body 5 connected thereto through a capillary tube 6. The pressure measuring end 7 has a sealing diaphragm 7a opposing a pressure measured portion 9. The detector body 5 has a pressure-receiving space 2 sealing a pressure transmitting medium 8 therein, a second pressure-receiving space 3 to which the atmospheric pressure is applied, and a means 4 for detecting the internal pressure of the pressure-receiving space 2 by way of its pressure difference with respect to thast of the second pressure-receiving space 3. A flexible protective tube 10 encloses a portion of the capillary tube 6 between the detector body 5 and the pressure measuring end 7. A second capillary tube 11 is housed in the protective tube 10 to be parallel to the capillary tube 6. The second capillary tube 11 extends from the second pressure-receiving space 3, has substantially the same length as the pressure-measuring side capillary tube 6, and has a closed distal end 11a in the vicinity of the pressure measuring end 7. A pressure transmitting medium 8 is sealed in the second pressure-receiving space 3 and the second capillary tube 11. In this embodiment, the pair of pressure-receiving spaces 2 and 3 formed in the detector body 5 are defined by a pressure detection sensor 4. The atmospheric pressure-side (reference pressure-side) pressure-receiving space is a liquid-sealed space defined by a sealing diaphragm 12. The second capillary tube 11 is connected to the space 3 through a passage 13.

With the above configuration, the reference pressure-side second capillary tube 11 is provided in the protective tube 10 together with a pressure measuring-side first capillary tube 6 to be parallel thereto. Therefore, even if the capillary tube 6 connecting the pressure measuring end 7 and the detector body 5 is locally heated and the internal sealing liquid 8 or the tube 6 itself is influenced by thermal expansion or the like, a change in volume thereof is temperature-compensated by the reference second capillary tube 11 arranged in the protective tube 10 together with the first capillary tube 6 as the pressure measuring side, thus prohibiting an outpout error caused by local temperature change. Namely, even if the pressure measuring-side capillary tube 6 is locally subjected to thermal influence, the same temperature condition is given to the other reference pressure-side pressure-receiving space by the second capillary tube 11. The internal sealing liquid 8 of the both pressure measuring systems is thermally expanded or shrunk under the same conditions. As a result, a measurement error as a conventional problem is eliminated.

The present invention is not limited to the above embodiment having the specific configuration. The shape and structure of the respective portions, such as the detector body 5, the coupling structure of the pressure-measuring side capillary tube 6 for connecting the detector body 5 to the pressure measuring end 7, an atmospheric pressure-side (reference pressure-side) pressure transmitting system, can be freely modified or changed as needed. The remote seal-type pressure signal generator 1 according to the present invention is not limited to a liquid level gauge as in the above-described embodiment. The same effect can be provided even if it is used as a pressure measuring device of various types of equipment and devices in various fields.

As described above, a remote seal-type signal generator according to the present invention comprises a pressure measuring end having a seal diaphragm opposing a pressure measured portion, and a detector body connected to the pressure measuring end through a capillary tube. The detector body has a pressure-receiving space in which a pressure transmitting medium is liquid-sealed and pressure detecting means for detecting the internal pressure of the pressure-receiving space by way of a pressure difference thereof with respect to a pressure of a second pressure-receiving space to which the atmospheric pressure is applied. A flexible protective pipe covers the capillary tube between the detector body and the pressure measuring end. A second capillary tube is housed in the protective tube. The second capillary tube extends from the second pressure-receiving space, has substantially the same length as the capillary tube, and has a distal end closed in the vicinity of the pressure measuring end. A pressure transmitting medium is liquid-sealed in the second pressure-receiving space and the second capillary tube. In this manner, the reference poressure-side second capillary tube is provided in a protective tube together with a pressure measuring-side capillary tube to be parallel thereto. Therefore, although the signal generator has a simple and inexpensive configuration, even if a capillary tube connecting a pressure measuring end and a detector body is locally heated and an internal sealing liquid or the tube itself is thermally influenced by thermal expansion or the like, a change in volume thereof is temperature-compensated by the second capillary tube arranged in the protective tube together with a pressure measuring-side capillary tube to be parallel thereto, thus prohibiting an output error caused by local temperature change. In this manner, the present invention has various excellent practical advantages.

A differential pressure detection will now be described with the reference to the system shown in FIG. 3. A remote seal-type differential pressure signal generator 1A has a detector body 4A and high and low pressure deriving sections 7A and 7B. The detector body 4A has a pair of pressure-receiving spaces 2A and 2B and a pressure detection sensor 3 for detecting a difference in pressure between the pressure-receiving spaces 2A and 2B. The pressure deriving sections 7A and 7B have sealing diaphragms 6A and 6B at pressure measuring ends connected to the pressure-receiving spaces 2A and 2B of the detector body 4 through capillary tubes 5A and 5B, respectively. Interior spaces continuously extend from inner chambers defined by the sealing diaphragms 6A and 6B of the pressure deriving sections 7A and 7B to the corresponding pressure-receiving spaces 2A and 2B of the detector body 4 through the capillary tubes 5A and 5B. A fill liquid 8A and B, such as silicone oil, is sealed in these spaces as a pressure transmitting medium. The pressure deriving sections 7A and 7B of the differential pressure signal generator 1 are coupled to high and low pressure deriving holes 9A and 9B formed in part of a tank 9A as a pressure measured portion.

Figure 4:
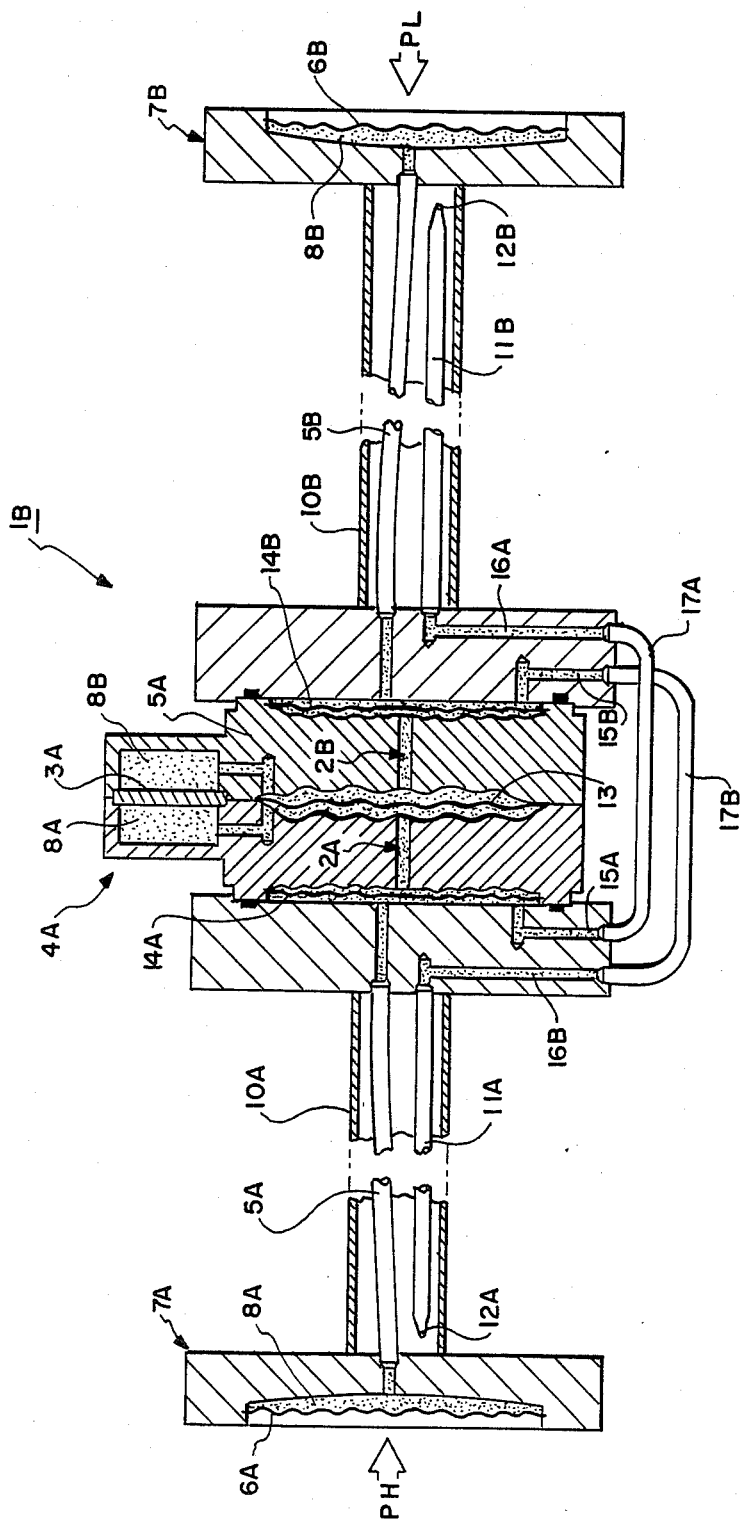
FIG. 4 is a cross-sectional illustration of a second embodiment of the present invention for use in the system shown in FIG. 3

The same reference numerals in FIG. 4 denote the same or equivalent portions as in FIG. 3, and a second detailed description thereof is omitted. The remote seal-type pressure signal generator 1B according to the present invention has the following characteristic features. Namely, a pair of first (pressure measuring-side) capillary tubes 5A and 5B are provided between a pair of pressure-receiving spaces 2A and 2B and high pressure (PH) and low pressure (PL) pressure measuring ends 7A and 7B. The pressure-receiving spaces 2A and 2B are defined in a detector body 4A having a sensor 3A as a pressure detecting means. The pressure measuring ends 7A and 7B have first sealing diaphragms 6A and 6B facing upper and lower positions 9A and 9B of a tank 9A as a pressure-measured portion. The first capillary tubes 5A and 5B are respectively covered by flexible protective tubes 10A and 10B. Second capillary tubes 11A and 11B for temperature compensation are arranged in the protective tubes 10A and 10B to be parallel to each other. The second capillary tubes 11A and 11B have substantially the same lengths as the capillary tubes 5A and 5B, respectively. One ends of the capillary tubes 11A and 11B are closed in the vicinity of the pressure measuring ends, as indicated by reference numeral 12A and 12B, respectively, and the other ends thereof are connected to the corresponding pressure-receiving spaces 2A and 2B of the detector body 4A. A fill liquid 8A and B, such as silicone oil, is sealed as a pressure transmitting medium in the pressure-receiving spaces 2A and 2B and the first and second capillary tubes 5A and 5B and 11A and 11B.

In this embodiment, the pair of pressure-receiving spaces 2A and 2B formed in the detector body 4A are defined by a center diaphragm 13 from each other and by second sealing diaphragms 14A and 14B from the capillary tubes 5A and 5B, respectively, so as to allow only pressure transmission thereamong. However, it will be easily understood that the second diaphragms 14A and 14B in the detector body 4A are not always needed and can be omitted. The sealing diaphragms 6A and 6B as pressure-receiving elements of the pressure deriving sections 7A and 7B face the interior of the tank 9. The high pressure-side diaphragm 6A faces the internal fluid at a lower portion of the tank 9A measures a heat pressure at a liquid level "h" and the low pressure-side diaphragm 6B measures the internal pressure at an upper portion of the tank 9A, thereby measuring the liquid level in the tank 9A by way of a differential pressure of the two pressures.

In the system of FIG. 3 described above, the high and low pressure-side capillary tubes 5A and 5B have the same lengths and provide the same pressure transmission at two pressure measuring systems. Therefore, the high pressure-side capillary tube 5A is helically wound and placed on an installation surface close to the tank 9A or the differential pressure signal generator 1A.

In the remote seal-type differential pressure signal generator 1A havlong the above configuration, the capillary tubes 5A and 5B coupling the pressure measuring ends 7A and 7B and the signal generator-side detector body 4 are made of a suitable material, e.g., stainless steel or the like, and are thermally expanded or shrunk by thermal influence of ambient temperature. Silicone oil or the like is sealed in the capillary tubes 5A and 5B as the sealing liquid 8A and 8B is also thermally expanded or shrunk. When such thermal expansion or the like occurs, the volumes of the capillary tubes 5A and 5B are changed. Even if the expansion amount of the sealing liquid 8 is considered, their pressure transmitting coefficients are changed, and an appropriate measurement value output cannot be obtained.

A second embodiment of a remote seal-type pressure signal generator for use in the system shown in FIG. 3 is shown in FIG. 4. A first pair of capillary tubes provided between a pair of pressure-receiving spaces and a pair of pressure measuring ends are respectively covered with flexible protective tubes. The pair of pressure-receiving spaces are formed in a detector body having a pressure detecting means and are defined by partitioning. The pair of pressure measuring ends have respective sealing diaphragms facing respective pressure measured portions. A second pair of capillary tubes having substantially the same lengths as the first capillary tubes are respectively arranged in the protective tubes to be parallel to each other. One ends of the second capillary tubes are closed in the vicinity of the pressure measuring ends and the other ends thereof are respectively connected to corresponding ones of the pressure-receiving spaces in the detector body. A pressure transmitting medium is liquid-sealed in the first and second capillary tubes.

In the described embodiment, the first capillary tubes 5A and 5B are respectively connected to the second opposing capillary tubes 11B and 11A, which are provided in the protective tubes 10B and 10A through passage holes 15a, 15b; 16a and 16b that are formed on the detector body 4A side outside the second sealing diaphragms 14A and 14B, and through external connection tubes 17a and 17b. However, the present invention is not always limited to this structure. For example, as shown in FIG. 5 in a third embodiment, the capillary tubes 5A and 5B continuous with the pressure-receiving spaces 2A and 2B can be connected to the opposing capillary tubes 11B and 11A through passage holes 18A and 18B; 16A and 16B; and connection tubes 17A and 17B.

With the above configuration, the second capillary tubes 11A and 11B are provided in the protective tubes 10A and 10B together with pressure measuring-side first capillary tubes 5A and 5B to be parallel thereto. Therefore, even if at least one of the capillary tubes 5A and 5B connecting the pair of pressure measuring ends 7A and 7B and the detector body 4 are locally heated and the internal sealing liquid 8A and 8B or the tube 5A or 5B itself is thermally influenced, a change in volume thereof is temperature-compensated by the second capillary tubes 11A and 11B arranged in the protective tubes 10A and 10B together with the first capillary tubes 5A and 5B as the pressure measuring side, thus prohibiting an output error caused by local temperature change.

In the embodiment described above with respect to FIG. 3, the remote seal-type differential pressure signal generator 1A is used as a liquid level gauge. However, the present invention is not limited to this. The same effect can be provided even if it is used as a differential pressure measuring device of various types of equipment and devices in various fields.

Accordingly, it may be seen that there has been provided, in accordance with the present invention, an improved remote seal-type pressure signal generator.

The embodiments of the present invention in which an exclusive property or privilege is claimed are defined as follows:

1. A remote seal-type signal generator comprising
   a first capillary tube having a pressure measuring end with a sealing diaphragm facing a pressure measured portion and continuous with said measuring end,
   a detector body connected to said pressure measuring end through said capillary tube, said detector body having a pressure-receiving space in which a pressure transmitting medium is liquid-sealed and pressure detecting means for detecting an internal pressure of said pressure-receiving space by way of a pressure difference thereof with respect to a pressure of a second pressure-receiving space to which atmospheric pressure is applied,
   a protective pipe covering said capillary tube between said detector body and said pressure measuring end, and
   a second capillary tube housed in said protective pipe, said second capillary tube extending from said second pressure-receiving space in said detector body, having substantially the same length as said first capillary tube, and having a distal end closed in the vicinity of said pressure measuring end, and the pressure transmitting medium is liquid-sealed in said second pressure-receiving space and said second capillary tube.

2. A signal generator as set forth in claim 1 wherein said protective pipe is a flexible tube.

3. A signal generator as set forth in claim 1 wherein said pressure-transmitting medium is silicone oil.

4. A remote seal-type differential pressure signal generator comprising
   a detector body said detector body having a pair of pressure-receiving spaces defined from each other and means for detecting a pressure difference therebetween,
   a first pair of capillary tubes having a pair of pressure measuring ends
   said pair of first capillary tubes respectively extending from said pressure-receiving spaces of said detector body, said pair of pressure measuring ends having sealing diaphragms respectively continuous with extending ends of said capillary tubes and facing a pressure-measured portion,
   a pair of protective pipes,
   said pair of protective tubes respectively covering said capillary tubes between said detector body and said pressure measuring ends, and
   second capillary tubes having substantially the same lengths as said first capillary tubes are respectively arranged in said protective pipes to be parallel to each other, one ends of said second capillary tubes are closed in the vicinity of said pressure measuring ends and the other ends thereof are respectively connected to corresponding ones of said pressure-receiving spaces in said detector body, and a pressure transmitting medium is liquid sealed in said first and second capillary tubes.

5. A signal generator as set forth in claim 4 wherein said pair of protective pipes are each a flexible tube.

6. A signal generator as set forth in claim 4 wherein said transmitting medium is silicone oil.

* * * * *